Aug. 17, 1965   W. KATZSCHNER   3,201,508
SUBMERSIBLE DOUBLE CYLINDRICAL CONTAINER
WITH OUTER WELDED COVERS
Filed March 5, 1963
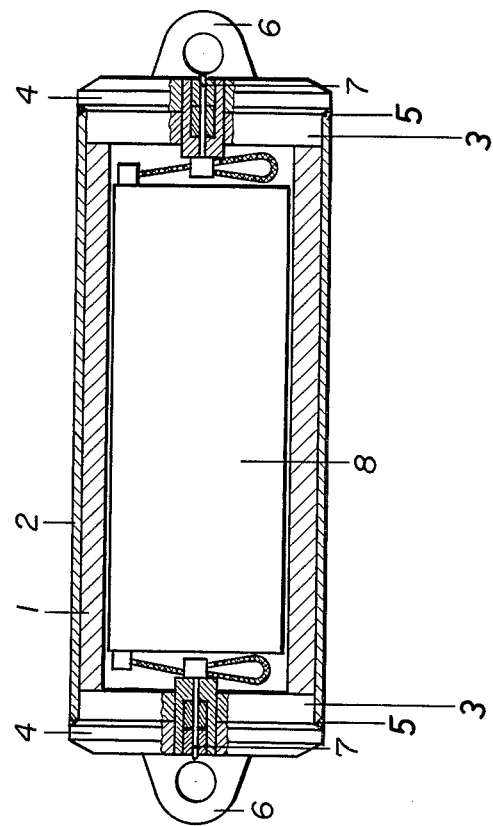
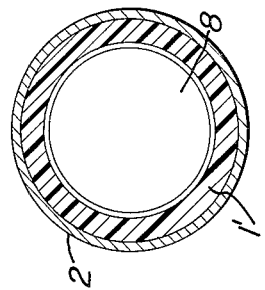
INVENTOR
Wolfgang Katzschner
By
Michael S. Striker
ATTORNEY

United States Patent Office 3,201,508
Patented Aug. 17, 1965

3,201,508
SUBMERSIBLE DOUBLE CYLINDRICAL CONTAINER WITH OUTER WELDED COVERS
Wolfgang Katzschner, Cologne-Mulheim, Germany, assignor to Felten & Guilleaume Carlswerk Aktiengesellschaft, Cologne-Mulheim, Germany
Filed Mar. 5, 1963, Ser. No. 262,892
Claims priority, application Germany, Mar. 15, 1962, F 36,276
2 Claims. (Cl. 174—50.51)

The present invention relates to a pressure resistant water-tight container adapted to hold and protect electrical apparatus and the like in submarine cable installations.

Such containers are submerged together with submarine cables and, particularly when the submarine cable installation is located at a considerable depth below the surface of the sea, the container will be exposed to a high outer pressure which, for instance, may be of the magnitude of 800 atmospheres. For this reason, the containers must be built of a material of high mechanical strength such as high strength steel having a tensile strength of more than 100 kg./mm.$^2$.

The container must be absolutely pressure-resistant under operating conditions, i.e., when deeply submerged in a submarine cable installation, and must be absolutely water-tight under such conditions. The conventional packing box seals or threaded flange seals cannot be used because they will not remain reliably water-tight for a sufficiently long period of time. Only soldered or welded connections of the container body and container cover or complete enveloping of the container in a homegeneous plastic cover seem to assure the required absolute water-tightness for sufficiently long periods of time.

The welding of container covers or lids to the body of the container in which the electrical apparatus is located, or the soldering of the cover, is connected with very considerable difficulties since heat damage to the sensitive electrical apparatus within the container must be avoided. When covering the entire container with a layer of plastic material, for instance by spraying a polyethylene layer thereon, an additional protective covering will be required, for instance a metal sleeve, in order to mechanically protect the outer face of the polyethylene layer. Furthermore, the polyethylene layer will not give the same assurance of absolute water-tightness as can be achieved by a welded connection between the container body and cover.

It is therefore an object of the present invention to overcome the above discussed difficulties and disadvantages.

It is a further object of the present invention to provide a container adapted for use in submarine cable installations, which container will be capable of withstanding exposure to high pressure, will be absolutely water-tight and will not be subject to harmful corrosion phenomena.

It is an aditional object of the present invention to provide a container having the qualities described hereinabove, capable of being manufactured in a simple and economical manner and having relatively small dimensions, i.e. having dimensions which need not substantially exceed those of the apparatus which is to be located within the container.

Other objects and advantages of the present invention will become apparent from a further reading of the description of the appended claims.

With the above and other objects in view, the present invention contemplates for use in submarine cable installations, a water-tight submersible container adapted to hold and protect electrical apparatus and the like and to withstand water pressure when submerged, the container comprising, in combination, an inner closed cylinder of high mechanical strength, and an outer closed cylinder closely fitting about and contacting the inner closed cylinder, the outer closed cylinder consisting essentially of a tubular body having at least one open end portion, and a cover welded to the open end portion so as to liquid-tightly close the same, whereby the closed container will be protected against deformation by water pressure due to the high mechanical strength of the inner closed cylinder and against penetration of water into the interior of the closed container due to the liquid-tightness of the outer closed cylinder.

The novel features which are considered as characteristic for the invention are set forth in particular in the appended claims. The invention itself, however, both as to its costruction and its method of operation, together with additional objects and advantages thereof, will be best understood from the following description of specific embodiments when read in connection with the accompanying drawings, in which:

FIG. 1 is a schematic axial cross-sectional view of a container according to the present invention; and FIG. 2 is a transverse cross section through another container according to the present invention.

Referring now to the drawing, it will be seen that the container according to the present invention comprises two superposed housings or closed cylinders which closely fit upon each other. The inner cylinder comprises a tubular body 1 having continuous outer and inner surfaces, and two covers 3 which fit onto the open ends of tubular body 1, for instance in the manner illustrated. Tubular body 1 and covers 3 consist of high strength material, for instance metal or, according to FIG. 2, tubular body 1' consists of reinforced synthetic material. However, tubular body 1 or 1' and covers 3 are not welded to each other so that upon placing an electrical apparatus 8 such as a repeater, amplifier or attenuator inside cylinder 1, and closing covers 3, the apparatus will not be exposed to heat such as would be developed by welding covers 3 onto tubular body 1. The outer cylinder consists of a relatively thin-walled tubular body 2, the wall of which, as illustrated, may be considerably thinner than the wall of the inner tubular body 1, and of two covers on transversal end walls 4. Tubular body 2 and covers 4 are formed of high grade corrosion-resistant steel such as high grade austenitic steel. Covers 4 and and tubular body 2 are firmly and water-tightly connected to each other by welding seams 5. Thus, according to the present invention, the required mechanical strength of the housing is provided by the inner cylinder consisting of tubular body 1 and covers 3, while water-tightness and corrosion-resistance is supplied by the outer cylinder formed of relatively thin tubular wall 2, covers 4 and welding seam 5.

It is possible and frequently desirable to form at the outer faces of covers 4 attaching means such as the annular lugs 6 shown in the drawing, for mounting the container onto the cable of a submarine cable installation.

Lead-ins for connecting the cable (not shown) with the electrical apparatus 8 inside the container are schematically illustrated and identified by reference numeral 7.

The high grade of steel of which the tubular wall and covers of the outer cylinder are formed and which might have a strength of only about 60 kg./mm.$^2$, can be easily welded and is corrosion-resistant against the attack of sea water. Thus, the outer cylinder of the container does not require an additional protective layer in order to prevent corrosion damage. The extensibility of the high grade steel of the outer container will counteract any tendency of the welding seams to form cracks.

Welding of the outer cylinder will cause only very little heating of the interior of the container since the welding seams are relatively thin and, furthermore, the inner cylinder serves as a protective shield against the passage of heat into the interior of the container, i.e., towards the electrical apparatus located therein.

For these reasons, it is possible, according to the present invention to provide a container which will safely protect sensitive electrical apparatus when submerged in submarine cable installation and, nevertheless, the container will be of relatively small dimensions.

Under certain conditions, particularly less severe conditions with respect to pressure exposure or depth below sea level of the installation, it is also possible to use as material for the inner cylinder a reinforced plastic material such as glass fiber reinforced polyester resin, in place of the high strength steel described hereinabove.

Good results according to the present invention are achieved by having the inner cylinder formed of high-strength steel, which need not be weldable and/or corrosion resistant, of the following composition: Cr 1.95%, Mo 0.3%, Ni 1.95%, Mn 0.45%, Si 0.25%, C 0.3%, the balance being iron; and having the outer cylinder formed of weldable, austenitic, high-quality corrosion-resistant steel of the following composition: Cr 17%, Mo 2.3%, Ni 12%, the balance being iron.

It will be understood that each of the elements described above, or two or more together, may also find a useful application in other types of containers differing from the types described above.

While the invention has been illustrated and described as embodied in a sealed water-tight submersible container for use in submarine cable installations, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in submarine cable installations, a water-tight submersible container adapted to hold and protect electrical apparatus and the like and to withstand water pressure when submerged, said container comprising, in combination, an inner, pressure-resistant thick-walled cylinder including a cylindrical peripheral wall and two transversal end walls at opposite ends of said cylindrical peripheral wall, said walls consisting of glass fiber reinforced polyester resin and being of substantial thickness so as to have high mechanical strength and be adapted to withstand water pressure when submerged in water; and an outer, closed sealing cylinder including a thin tubular peripheral wall enclosing said cylindrical peripheral wall of substantial thickness of said inner pressure-resistant cylinder, supported by the same and of two transversal end walls located outwardly from said transversal end walls of said inner pressure-resistant thick-walled cylinder supported by the same and water-tightly closing along their edges the opposite ends of said thin tubular peripheral wall of said outer closed sealing cylinder, whereby said outer closed sealing cylinder will be supported by said inner closed thick-walled pressure-resistant cylinder while said outer closed sealing cylinder water-tightly encloses said inner pressure-resistant thick-walled cylinder.

2. For use in submarine cable installations, a water-tight submersible container adapted to hold and protect electrical apparatus and the like and to withstand water pressure when submerged, said container comprising, in combination, an inner, pressure-resistant thick-walled cylinder free of weld seams, said inner cylinder including a cylindrical peripheral wall having continuous outer and inner surfaces, and two transversal end walls at opposite ends of said cylindrical peripheral wall at least one of said two transversal end walls forming a removable cover, said walls consisting of pressure-resistant steel and being of substantial thickness so as to have high mechanical strength and be adapted to withstand water pressure when submerged in water; and an outer closed sealing cylinder including a thin tubular peripheral wall enclosing said cylindrical peripheral wall of substantial thickness of said inner pressure-resistant cylinder, supported by the same, and of two transversal end walls located outwardly from said transversal end walls of said inner pressure-resistant thick-walled cylinder supported by the same and welded to and water-tightly closing along their edges the opposite ends of said thin tubular peripheral wall of said outer closed sealing cylinder, the walls of said outer closed sealing cylinder consisting of high grade austenitic steel, whereby said outer closed sealing cylinder will be supported by said inner closed thick-walled pressure-resistant cylinder while said outer closed sealing cylinder water-tightly encloses said inner pressure-resistant thick-walled cylinder.

References Cited by the Examiner

UNITED STATES PATENTS

| | | | |
|---|---|---|---|
| 2,110,457 | 3/38 | Wentz. | |
| 2,155,650 | 4/39 | Gilbert | 174—70 |
| 2,471,465 | 5/49 | Hasselt | 174—70 |
| 2,697,739 | 12/54 | Presswell | 174—70 |
| 2,788,510 | 4/57 | Howes | 340—7 X |
| 2,803,694 | 8/57 | Pouzet | 174—70 |
| 2,938,067 | 5/60 | Werner | 174—70 |

JOHN F. BURNS, *Primary Examiner.*

JOHN P. WILDMAN, E. JAMES SAX, DARRELL L. CLAY, *Examiners.*